Sept. 25, 1962 R. H. MALLARD 3,055,663

SOUND REPRODUCING MACHINES

Filed April 28, 1960 3 Sheets-Sheet 1

INVENTOR
RICHARD HENRY MALLARD
BY [signature]
ATTORNEY

INVENTOR
RICHARD HENRY MALLARD
BY [signature]
ATTORNEY

Sept. 25, 1962 R. H. MALLARD 3,055,663

SOUND REPRODUCING MACHINES

Filed April 28, 1960 3 Sheets-Sheet 3

INVENTOR
RICHARD HENRY MALLARD
BY [signature]
ATTORNEY

United States Patent Office 3,055,663

Patented Sept. 25, 1962

3,055,663
SOUND REPRODUCING MACHINES

Richard Henry Mallard, London, England, assignor to Foster-Mallard Limited, London, England Filed Apr. 28, 1960, Ser. No. 25,424
9 Claims. (Cl. 274—10)

This invention relates to sound reproducing machines of the kind in which grooved disc-shaped records are used in association wtih a pick-up device, means being provided to support a plurality of records in an upper position concentrically above the turntable and to rotate the said records so that the recording on the underside of each record may be played before that record is dropped onto the turntable, using an upwardly projecting stylus on the pick-up, the recording on the upper side of each record being played after the record has dropped, by a second stylus projecting downwardly from the pick-up.

It has been proposed to mount the records to be played in a stack on a spindle which rotates as one with the turntable, thereby making it necessary that the turntable shall be capable of being rotated in both directions, since a record, when being played on its underside, must rotate in the direction opposite to that in which it rotates for the playing of its upper side. A reversible electric motor may be used, but it may be preferred to employ an electric motor which rotates always in one direction, and to drive the turntable through a reversing gear.

Since, when both sides of a record are to be played, the dropping of the record on to the turntable always follows an underside playing operation, the dropping operation can be associated with a change from underside playing to top side playing, but provision has to be made, if it is desired also to be able to play only the top or undersides of several records automatically one after another, for dropping a record immediately after the top or underside of the preceding record has been played.

The object of the present invention is to provide an improved mechanism for controlling the dropping of records stacked on a spindle rotating with the turntable of a sound reproducing machine.

According to the invention, in a sound reproducing machine of the kind referred to and including a spindle rotatable with the turntable and arranged to support the stack of records concentrically above the turntable, record releasing means on the spindle operable by axial movement of a stem in the spindle, a rotary control member brought into operation to effect a control cycle at the termination of the playing of each record side, and a two-way selector operable by said rotary control member to provide, according to its setting, conditions for underside playing or top side playing respectively, the rotary control member also determining the motions of the pick-up arm during the control cycle, the said rotary control member actuates during each control cycle, a first element of a transmission linkage for moving the stem of the record releasing means, there being included in the said transmission linkage an element movable from an operative position to an inoperative position to enable the first element to be actuated wtihout moving the said stem and said movable element being coupled to the two-way selector for operation thereby.

The movable element may comprise a pad movable by the two-way selector into and out of a position between an arm moved during each control cycle and the stem, the stroke of the arm being so limited that it is unable to move the stem when the pad is out of the said position.

The pad may be carried by a flexible arm movable in a plane substantially perpendicular to the axis of the stem by a pin mounted on the two-way selector.

The transmission linkage may comprise a pivoted arm constituting the first element thereof and movable through a predetermined angle during each control cycle and a second pivoted arm permanently linked to means acting on the stem to effect axial movement thereof, one of said arms having mounted thereon an element movable by the two-way selector between an operative position in which it projects towards the other arm and transmits movement of one arm to the other, and an inoperative position in which it permits the arm constituting the first element of the transmission linkage to move through the predetermined angle without moving the second arm.

The movable element may comprise a bell-crank lever pivotally mounted at its elbow on one of the arms.

The invention is hereinafter described with reference to the accompanying drawings, in which.

Figures 1, 3, 4:
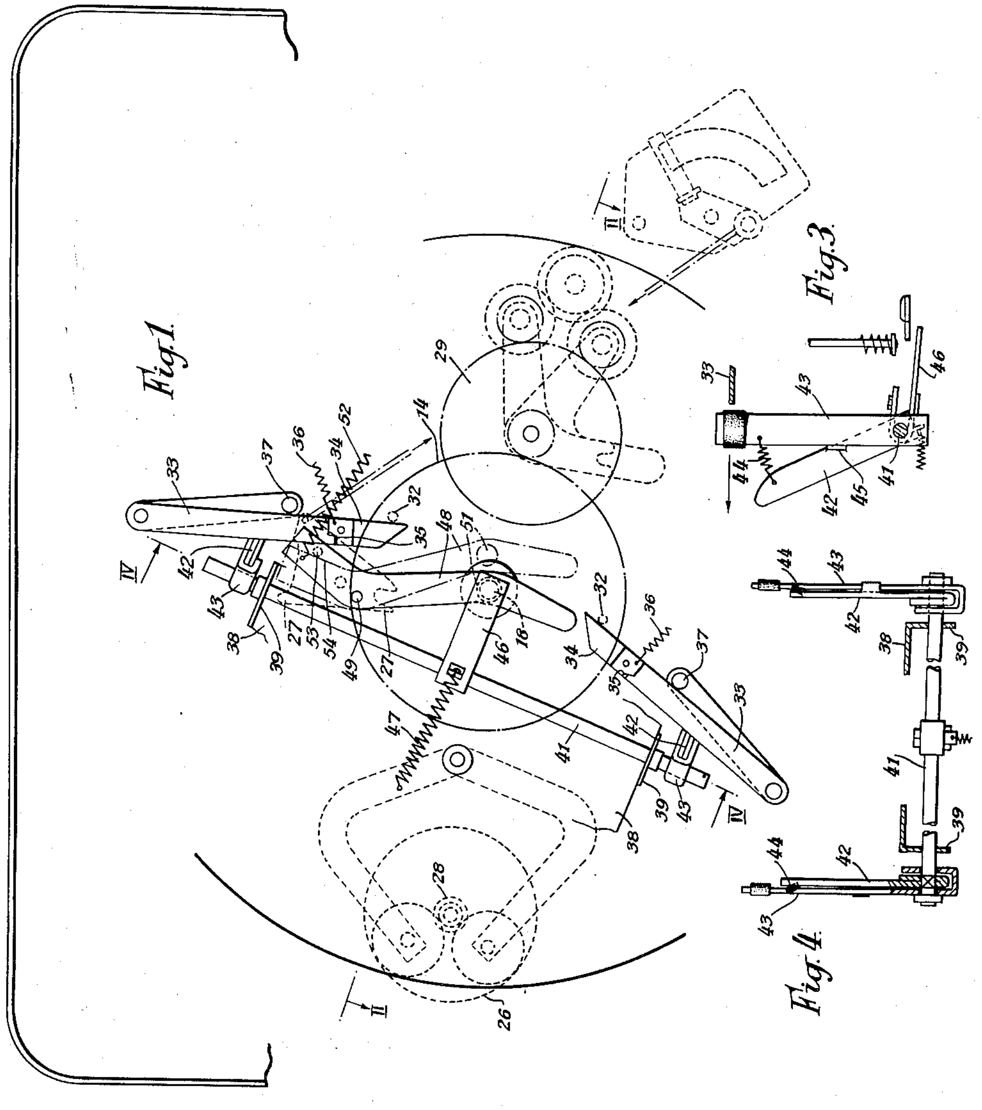
FIGURE 1 is an inverted plan view of a sound-reproducing machine including one embodiment of the invention, only those parts of the mechanism essential to an understanding of the invention being shown.
FIGURE 3 is an end view of the operating arm assembly shown in FIGURE 1.
FIGURE 4 is a section on the line IV—IV of FIGURE 1.
Figures 2, 6:
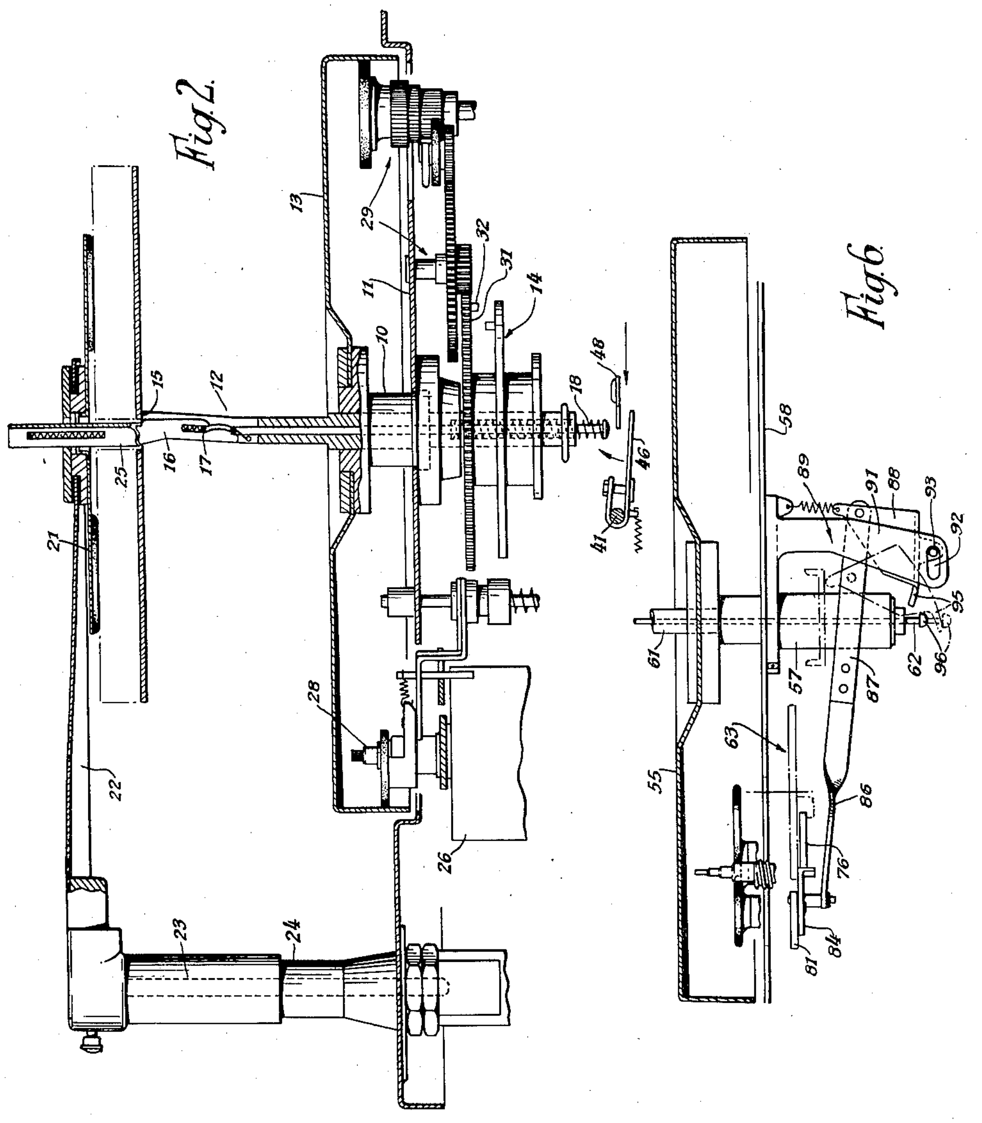
FIGURE 2 is a section approximately on the line II—II of FIGURE 1.
FIGURE 6 is a side view looking in the direction of the arrow 4 in FIGURE 2.

The sound reproducing machine shown in FIGURES 1 and 2 of the drawings is more fully described and illustrated in the specification and drawings accompanying our co-pending application No. 24,013/58, but is sufficiently described and illustrated herein for an understanding of the present invention.

Referring to FIGURES 1 and 2 of the drawings a sleeve 10 mounted on the underside of a base-plate 11 below an aperture therein provides internally a bearing for a spindle 12 on which is mounted, above the base-plate, a turntable 13, the said sleeve 10 also providing, externally, a bearing for a rotary control unit 14 mounted below the base plate 11. The spindle 12 has a shoulder 15 to support, spaced vertically above the turntable, the lowermost of a stack of records, and a record release finger 16 pivoted at 17 in a slot in the spindle, is operable to release the records one-by-one from the shoulder 15 and allow them to drop on to the turntable. The finger 16 is operated by a stem 18 slidable in a bore in the spindle 12 and carrying a pin 19 which co-operates with a cam edge on the finger 16 so that longitudinal movement of the stem rocks the finger about its pivot. The records supported by the shoulder 15 are maintained in a substantially horizontal position by an upper turntable 21 carried by an arm 22 mounted on a shaft 23 slidable in a pillar 24 upstanding from the base plate 11, the said upper turntable 21 being driven by the spindle 12 to which it is keyed by a slidable keeper 25 acting also to hold records above the lowermost in the stack against lateral movement by the release finger 16.

The pick-up of the machine and its associated parts are not shown in the drawing, the pick-up being mounted on a pick-up arm swinging about a vertical axis and being also capable of up and down movement to bring an upwardly projecting stylus on the pick-up into engagement with the underside of a record resting on the shoulder 15, or to bring a downwardly projecting stylus on the pick-up into engagement with the top side of a record resting on the turntable. The movements of the pick-up arm are controlled by the rotary control unit 14 in the manner described in our co-pending application No. 24,013/58, and the said rotary control unit also operates, as described in that application, a reversing switch for an electric motor 26 driving the turntable, and a fork member 27 constituting a two-way selector which determines whether the pick-up moves upwardly or downwardly to engage a record.

The electric motor 26 drives the turntable through a stepped driving wheel 28 and friction wheels, the friction wheels being movable axially of the driving wheel to enable the speed of the turntable to be changed, and the rotary control unit is driven by the turntable 13 through a drive transmission generally indicated at 29, also providing for changes of speed to enable the control unit to be driven at the same speed whatever may be the speed of rotation of the turntable.

The driving mechanism for the turntable and rotary control unit are also fully described in our co-pending application No. 24,013/58, together with the speed-change mechanism.

The rotary control unit 14 includes a gear wheel 31 meshing with a pinion of the transmission 29, and on this gear wheel is mounted, adjacent its periphery, a pin 32 projecting parallel to the axis of the gear wheel. Two arms 33, 33 are pivotally mounted on the underside of the base plate 11 so as to extend inwardly from their pivots, each of the arms 33 having mounted thereon a pivoted cranked extension 34 which projects into the path of the pin 32. The extensions 34 are urged against stops 35 on the arms 33 by coiled tension springs 36 which also serve to urge the said arms 33 against stops 37 on the base-plate, the arrangement being such that, during rotation of the ortary control unit in one direction one arm 33 is displaced against the resistance of its spring 36 by the action of the pin 32 whilst the extension 34 of the other arm 33 is merely deflected away from its stop on the arm, whereas during rotation of the rotary control unit in the other direction the other arm 33 is displaced and the extension 34 of the other arm is deflected without moving the arm.

A carrier plate 38 mounted in spaced parallel relation to the base plate 11 and below the latter has two turned-down ears 39, 39 apertured to provide journals for a shaft 41 on each end of which is rigidly secured an arm 42 extending upwardly towards the base-plate. To each arm 42, adjacent the shaft 41, is pivotally connected another arm 43 extending upwardly into the path of movement of one of the arms 33, each arm 43 being urged by a tension spring 44 against a stop 45 on its companion arm 42, and the arrangement being such that movement transmitted by an arm 33 to an arm 43 is transmitted through a spring 44 to the companion arm 42.

The shaft 41 has rigidly secured to it another arm 46 the free end of which lies below the lower end of the stem 18, and a spring 47 coupled to the arm 46 and to an anchorage on the carrier plate 38 urges the shaft 41 in a direction to move the free end of the arm 46 downwardly.

A flexible arm 48 mounted on a vertical pivot at 49 on the carrier plate 38 carries a pad 51 urged by a tension spring 52 extending between the said arm 48 and an anchorage on the carrier plate 38 to a position in which the pad 51 lies between the free end of the arm 46 and the lower end of the stem 18. The fork member 27 carries a pin 53 projecting through a slot in the carrier plate 38 to engage an edge 54 on the arm 48, the pin 53, in one position of the fork member 27, holding the arm 48, against the tension of the spring 52, in a position clear of the path of movement of the arm 46. The arm 48 is shown in full lines in FIGURE 1 in the first-mentioned position and in chain-dotted lines in the other position.

The rotary control unit 14, as described in our copending application No. 24,013/58, effects a control cycle when the machine is set in motion to play a batch of records, and makes a further control cycle after each record side has been played. If both sides of each record are to be played, each control cycle includes a half revolution of the rotary control unit in one direction followed by reversal of the electric motor and a half revolution of the rotary control unit in the opposite direction, the direction of the first half revolution in each case depending on the direction of rotation of the turntable during the preceding playing operation. If only one side of each record is to be played each control cycle includes a complete revolution of the rotary control unit all such revolutions being in the same direction as the first half revolution of the said unit following the playing of the top-side of a record when both sides are being played.

When only one side of each record is being played, a record must be dropped after each playing operation, but when both sides are being played a record must be dropped only after the playing of an underside, so it follows that the record dropping mechanism must be operable by rotation of the rotary control unit in both directions, but its operation must be inhibited during a change cycle following the playing of the top side of a record if both sides are being played.

This result is achieved with the mechanism described, since the fork member 27 is moved at the initiation of each control cycle during playing of both sides of the records to move the pad 51 into its operative position after the underside of a record has been played, and into its inoperative position after the top side of a record has been played, thus ensuring that the record release finger is moved only after the playing of the underside of a record. When the machine is set to play one side only of each record, however, the pad 51 is set in its operative position and the fork member 27 is moved to a position in which it is not operated by the rotary control unit, so that movement of the arm 46 is transmitted to the stem 18 during each control cycle, the machine, as described in our copending application No. 24,013/58, being so arranged that at the conclusion of the playing of a stack of records the pad 51 is in its operative position and the fork member 27 is moved to its inoperable position, and operation for playing both sides or only one side of each record being selected by operating a manual control member.

Figure 5:
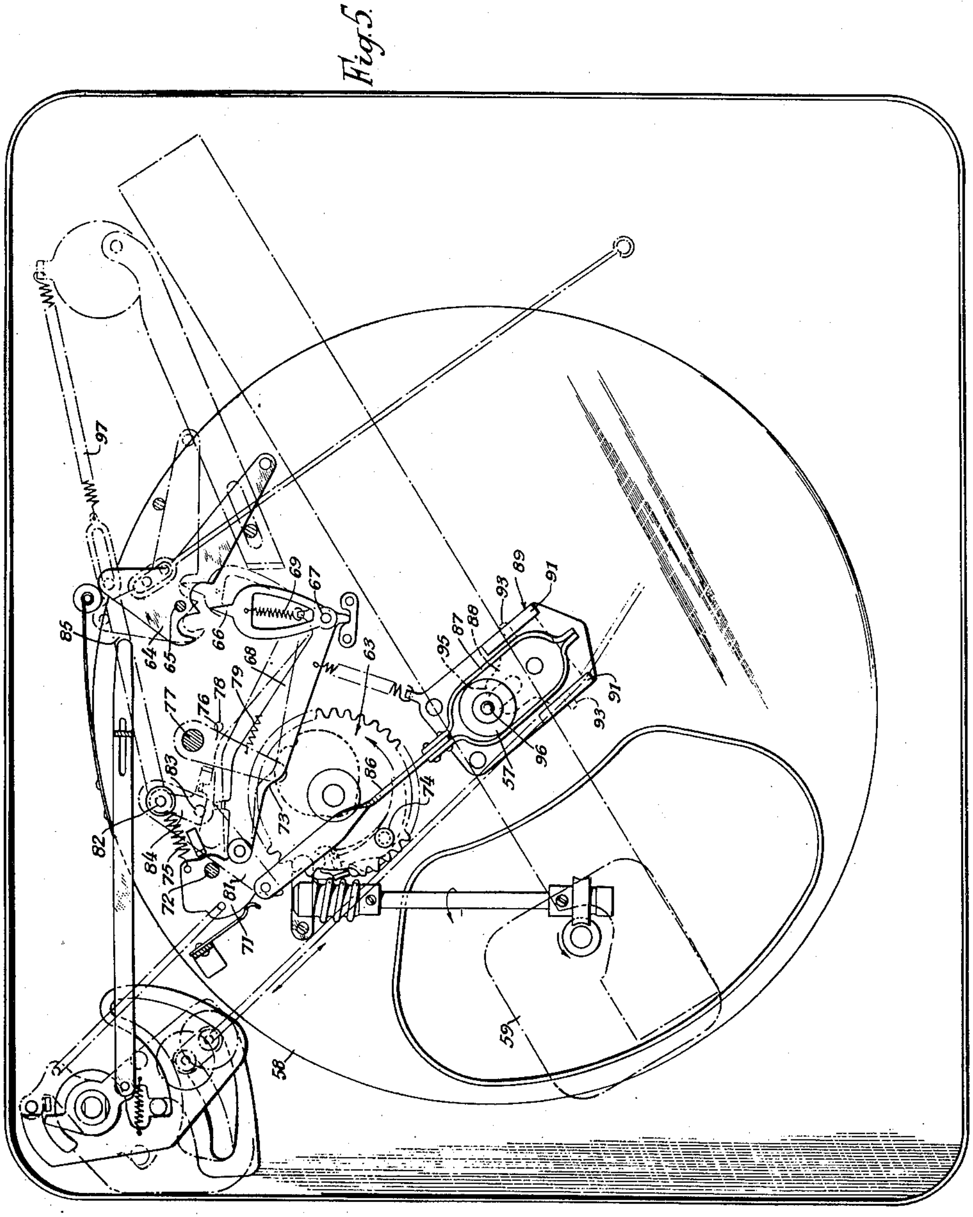
FIGURE 5 is an inverted plan view similar to FIGURE 1 showing another embodiment of the invention.

In the embodiment of the invention shown in FIGURES 5 and 6, the turntable 55 is mounted on a tubular shaft 56 rotatable in a sleeve 57 secured to the underside of a base plate 58, and is driven by an electric motor 59 through a friction drive generally similar in arrangement to that described in our co-pending application No. 24,013/58. A spindle 61 generally similar to that described in connection with the preceding embodiment of the invention is mounted in the tubular shaft so as to rotate with the turntable, and is slotted to receive a record release finger (not shown) also similar to that already described but having its cam edge modified in shape to enable its operative stroke to be effected by downward movement of a stem 62 slidable in a bore in the spindle. A rotary control unit indicated diagrammatically at 63 is driven by the electric motor 59 through reduction gearing, means being provided to engage the drive to said rotary control unit manually, and also automatically in response to the final inward movement of the pick-up arm of the machine when the playing of a record side is completed, the rotary control unit, each time the drive thereto is engaged, making one complete revolution, always in the same direction. The rotary control unit 63 controls the movements of the pick-up arm through mechanism not shown.

A two-way selector 64 pivotally mounted at 65 is operable to change its position by a pecker member 66 pivotally mounted at 67 on an arm 68 and biased by a tension spring 69 to a mean position relative thereto, the pecker member being movable into one or other of two notches in the selector 64, one on each side of a V-shaped nose *64a* thereon, to rock the selector 64 in opposite directions about its pivot at 65. The arm 68 is pivoted on a plate 71 itself pivoted at 72 and movable to bring an edge portion 73 on the arm 68 into or out of the path of movement of a driving pin 74 on the control unit 63 and, when the said edge portion is in the said path of movement, the driving pin 74, during each revolution of the rotary control unit, moves the arm against the resistance of a return spring 75 to cause the pecker member 66 to enter a notch in the selector 64 and rock the latter to its other position. The pecker member moves the selector 64 in opposite directions during succeeding revolutions of the rotary control unit, because the movement of the selector causes the nose 64*a* to move across the line of movement of the tip of the pecker member. The selector 64 determines whether the pick-up is moved upwardly or downwardly to co-operate with a record above or on the turntable, and is also linked to a reversing mechanism (not shown) for reversing the direction of revolution of the turntable.

The driving pin 74, after actuating the arm 68, engages and displaces through a predetermined angle an arm 76 pivotally mounted at 77 and urged against a stop 78 by a return spring 79, the said arm 76 constituting the first element of a transmission linkage for moving the stem 62 downwardly. Another arm 81, pivoted at 82, has pivoted thereto at 83 a bell-crank lever 84, the pivot 83 of the bell-crank lever being at the elbow thereof and one limb of the bell-crank lever being connected by a pivoted link 85 to the two-way selector 64 so that the movement of the said selector moves the bell-crank lever about its pivot. The other limb of the bell-crank lever, in one position of the two-way selector, projects towards the arm 76 as shown in full lines in FIGURE 5 and transmits movement of that arm to the arm 81, whereas, in the other position of the two-way selector the said other limb occupies the position shown in chain-dotted lines in FIGURE 5, and the arm 76 is able to make its full stroke without moving the arm 81.

The arm 81 has pivoted to its free end a tension link 86 having a looped portion 87 embracing the sleeve 57 and pivoted at its other end to a rocking member 88. The rocking member 88 is mounted on a bracket 89 which is shown as being integral with the sleeve 57, the bracket 89 including two dependent arms 91, 91 slotted horizontally at 92 to receive a pair of trunnions 93 on the rocking member 88. A coiled tension spring 94 connected between the rocking member 88 and an anchorage point on the bracket tends to hold the rocking member 88 in the position shown in full lines in FIGURE 6. The rocking member includes a fork 95 arranged to cooperate with an enlargement 96 on the lower end of the stem 62. The rocking member 88 normally occupies the position shown in full lines in FIGURE 4, in which the fork 95 is clear of the enlargement 96, and the stem 62 can be withdrawn upwardly from the spindle 61, thus facilitating the removal of records which have dropped on to the turntable, and the arm 81 then also occupies the position shown in full lines in FIGURE 5. When the arm 76 is moved by the driving pin 74, and its movement is transmitted to the arm 81, a pull is applied to the tension link 86 which first causes the trunnions 93 to slide in the slots 92 to cause the fork 95 to embrace the stem 62 above the enlargement 96 thereon, and then moves the rocking member 88 about its pivot to exert a downward pull on the stem and so actuate the record release finger. It will be evident that such movement of the rocking member can be effected only if the two-way selector 64 is in the appropriate position, so that the dropping of a record is effected only during alternate control cycles when the machine is set for playing both sides of the records, but, by leaving the selector 64 in the appropriate position, dropping can be effected during each cycle when only one side of each record is being played. The setting of the machine for playing both sides or only one side of each record is effected by a manual control substantially as described in connection with the preceding example.

The end of the link 85 which is coupled to the two-way selector 64 is slotted to engage a pin on the said selector, and has connected to it a tension spring 97 acting to pull the link to the position in which the bell-crank lever is operative. The said bell-crank lever is thus moved positively to its inoperative position by movement of the two-way selector in one direction, but movement of the said selector in the other direction merely releases the bell-crank lever for movement by the spring 97. The arrangement is such that when the bell-crank lever is in its operative position, the pivot of the link 85 thereto is substantially coincident with the pivot of the arm 81.

I claim:

1. In a sound reproducing machine having a spindle, a bore in said spindle, an axially movable stem in said bore, a turntable rotatable with said spindle, said turntable arranged to support records coaxially stacked thereon, a pick-up arm, and record releasing means on said spindle, said means being operable by axial movement of said stem in said spindle; a rotary control member for performing a control cycle at the termination of the playing of a record side, a two-way selector operable by said member, means for playing the underside and the topside of said records, respectively, said means being actuated by said selector, said member furthermore determining the motions of said pick-up arm during said control cycle, a transmission linkage having a first element thereon for moving said stem of said record releasing means, and a second element included in said transmission linkage, said second element being movable from an operative position to an inoperative position for rendering said first element to be actuated without moving said stem, said second element being coupled to said selector.

2. In a sound reproducing machine according to claim 1, means for axially moving said stem, said arm being moved during each one of said control cycles, and said second element comprising a pad movable by said two-way selector into and out of a position respectively between said means and said stem, the stroke of said means being limited for rendering said stem immovable when said pad is out of said position between said stem and said pad.

3. In a sound reproducing machine according to claim 2, wherein said pad is carried by a flexible arm movable in a plane substantially perpendicular to said axis of said stem by a pin mounted on said selector, said pin supporting said flexible arm.

4. In a sound reproducing machine according to claim 2, wherein said transmission linkage comprises a first pivoted arm constituting said first element thereon, said pivoted arm being movable through a predetermined angle during each one of said control cycles, a second pivoted arm, means acting on said stem to effect axial movement thereof, said means being permanently linked to said second pivoted arm, one of said arms having mounted thereon said second element movable by said selector between an operative position in which it projects towards the other one of said arms, transmitting movement of one of said arms to the other of said arms, and an inoperative position permitting said arm constituting said first element of said transmission linkage to move through said predetermined angle without moving said second arm.

5. In a sound reproducing machine according to claim 4, wherein said second element comprises a bell-crank lever pivotally mounted at its elbow on one of said arms.

6. In a sound reproducing machine according to claim 5, wherein said bell-crank lever is pivotally mounted on said second arm, and comprises connecting one of the limbs of said bell-crank lever to said two-way selector, the pivotal point of said link on said bell-crank lever coinciding with the pivotal point of said second arm when the bell-crank lever is in its operative position.

7. In a sound reproducing machine according to claim 6, including a tension bar, a rocking member, and a fixed bracket, said rocking member mounted in said bracket, and being pivotally connected with said second arm by said tension bar, said rocking member cooperating with said stem.

8. In a sound reproducing machine according to claim 7, further including a mounting for said rocking member for sliding and rocking movement relative to said bracket, said tension link first imposing a sliding movement on said rocking member for engagement with said stem and then a rocking movement for effecting an axial movement of said stem.

9. In a sound reproducing machine according to claim 8, further including means connected to said rocking member for exerting a downward pull on said stem.

References Cited in the file of this patent

UNITED STATES PATENTS

| | | |
|---|---|---|
| 2,777,699 | Woodruff | Jan. 15, 1957 |
| 2,837,337 | Mueller | June 3, 1958 |
| 2,860,880 | Mueller | Nov. 18, 1958 |
| 2,960,340 | Seidel et al. | Nov. 15, 1960 |